United States Patent
Bilger et al.

(10) Patent No.: US 9,930,907 B2
(45) Date of Patent: *Apr. 3, 2018

(54) CONVEYOR RAIL SUPPORT, CRYOGENIC FREEZER, AND METHOD OF COOLING FOOD

(71) Applicant: AirGas USA, LLC, Radnor, PA (US)

(72) Inventors: Stephen Bilger, Houston, TX (US); David C. Braithwaite, Houston, TX (US)

(73) Assignee: Airgas, Inc., Houston, TX (US)

( * ) Notice: Subject to any disclaimer, the term of this patent is extended or adjusted under 35 U.S.C. 154(b) by 117 days.

This patent is subject to a terminal disclaimer.

(21) Appl. No.: 14/477,405

(22) Filed: Sep. 4, 2014

(65) Prior Publication Data

US 2014/0377432 A1    Dec. 25, 2014

Related U.S. Application Data

(63) Continuation of application No. 12/752,114, filed on Mar. 31, 2010, now Pat. No. 8,844,315.

(51) Int. Cl.
| | |
|---|---|
| *A23L 3/375* | (2006.01) |
| *F25D 25/04* | (2006.01) |
| *A23L 3/36* | (2006.01) |
| *F25D 3/11* | (2006.01) |
| *B65G 21/06* | (2006.01) |
| *B65G 41/00* | (2006.01) |
| *B65G 21/12* | (2006.01) |
| *B65G 21/02* | (2006.01) |

(52) U.S. Cl.
CPC ............. *A23L 3/375* (2013.01); *A23L 3/361* (2013.01); *F25D 3/11* (2013.01); *F25D 25/04* (2013.01); *B65G 21/02* (2013.01); *B65G 21/06* (2013.01); *B65G 21/12* (2013.01); *B65G 41/001* (2013.01); *F25D 2400/22* (2013.01)

(58) Field of Classification Search
CPC .................................. F25D 3/11; F25D 25/04
See application file for complete search history.

(56) References Cited

U.S. PATENT DOCUMENTS

| | | | |
|---|---|---|---|
| 3,455,120 A | 7/1969 | Schlemmer | |
| 3,841,109 A | 10/1974 | Cann | |
| 3,878,936 A * | 4/1975 | Niggemyer | 198/860.2 |
| 3,879,954 A | 4/1975 | Cann | |
| 7,048,112 B2 * | 5/2006 | Formigoni et al. | 198/861.3 |
| 2005/0029078 A1 | 2/2005 | Formigoni et al. | |

(Continued)

FOREIGN PATENT DOCUMENTS

| | | |
|---|---|---|
| CA | 2 673 802 | 1/2010 |
| EP | 0 249 323 | 12/1987 |

(Continued)

OTHER PUBLICATIONS

International Search Report and Written Opinion for PCT/US2011/029518, dated May 30, 2012.

*Primary Examiner* — Tareq Alosh

(74) *Attorney, Agent, or Firm* — Christopher J. Cronin

(57) ABSTRACT

A cryogenic freezer includes a plurality of conveyor rail supports that rest upon side walls of a lower housing of the freezer. The conveyor rail supports include upper and lower bars that support upper and lower conveyor support rails extending perpendicular to the bars.

8 Claims, 6 Drawing Sheets

(56) References Cited

U.S. PATENT DOCUMENTS

2006/0254887 A1\* 11/2006 Aubry et al. .............. 198/860.3
2008/0289619 A1 11/2008 Schjerven et al.
2011/0185761 A1\* 8/2011 Trembley et al. .............. 62/374

FOREIGN PATENT DOCUMENTS

| EP | 1 149 779 | 10/2001 |
|----|-----------|---------|
| GB | 914 026 | 12/1962 |
| WO | WO 2009 114 610 | 9/2009 |

\* cited by examiner

CONVEYOR RAIL SUPPORT, CRYOGENIC FREEZER, AND METHOD OF COOLING FOOD

CROSS-REFERENCE TO RELATED APPLICATIONS

This application is related to U.S. Design patent application Ser. No. 29/358,232 filed Mar. 24, 2010 and is a Continuation of U.S. patent application Ser. No. 12/752,114, filed Mar. 31, 2010.

SUMMARY

The benefits of using a cryogen, such as liquid nitrogen (LIN), to cool and freeze food products are well-known. In addition to dramatically decreasing the time required to freeze a particular food product, in many cases the taste, color, and texture of a cryogenically-frozen food product is superior to conventional, non-cryogenic freezing methods.

Cryogenic tunnel freezers are a common type of cryogenic freezer in the food industry. In a cryogenic tunnel freezer, the food product is cooled by passing the food product through the tunnel along a belt and exposing the food product to the cryogen within the tunnel, such as that disclosed in U.S. Pat. No. 3,455,120 (Schlemmer). Most conventional tunnel freezers include fans located within the tunnel that circulate the cryogen. In the Schlemmer patent, the food was exposed to a cryogenic liquid sprayed in the tunnel during movement of the food on the conveyor through the housing.

One of the problems encountered in using a cryogenic freezing unit such as disclosed in the Schlemmer patent is the difficulty of maintaining the freezer unit in an extremely sanitary condition. During use, pieces of food drop on the conveyor, the conveyor pan and in the housing; periodically, this food must be removed from the housing. Various attempts have been made to make the inside of the housing of cryogenic freezer units more accessible for ease in cleaning. For example, in the Schlemmer patent, the top panel of the housing is removable. However, such an arrangement does not expose the bottom of the housing sufficiently to allow it to be cleaned easily and thoroughly.

Two other problems encountered in freezing by the application of cryogenic liquid are thermal stress and the relatively high capital cost of the freezer. Typically, cryogenic freezers are made of stainless steel for easier cleanability. The relatively high capital expense can be reduced by replacing some of stainless steel with less expensive materials. However, a cryogenic freezer made partially of stainless steel and partially of one or two other materials can experience a relatively high degree of thermal stress due to the mismatch in coefficients of thermal expansion of the various materials of construction.

Thus, there is a need in the art for an improved cryogenic freezer that can be easily and thoroughly cleaned, has a suitably low capital cost, and experiences reduced thermal stress.

SUMMARY

There is disclosed a conveyor rail support, comprising: parallel spaced vertically extending first and second support members; an upper bar connected to and extending between the first and second support members, the upper bar having a plurality of notches formed into an upper side thereof that are adapted and configured to loosely engage and hold a corresponding plurality of upper conveyor support rails extending horizontally in a direction perpendicular to the upper bar; a lower bar parallel to the upper bar being connected to and extending between the first and second support members underneath the upper bar, the lower bar having a plurality of notches formed into an upper side thereof that are adapted and configured to loosely engage and hold a corresponding plurality of lower conveyor support rails extending horizontally in a direction perpendicular to the lower bar; a first leg extending outwardly away from the first support member; and a second leg extending outwardly away from the second support member, the first and second legs being adapted and configured to support the conveyor rail support upon upper surfaces of first and second side walls of a lower housing of a freezer.

There is also disclosed a conveyor support system, comprising: a plurality of the above-disclosed conveyor rail supports; a plurality of upper conveyor support rails adapted and configured to support travel of an upper portion of an endless conveyor; and a plurality of lower conveyor support rails adapted and configured to support travel of a lower portion of an endless conveyor, wherein the plurality of conveyor rail supports are spacingly arranged so as to engage and hold the plurality of upper conveyor support rails in the notches of the upper bars and to engage and hold the plurality of lower conveyor support fails in the notches of the lower bars.

There is also disclosed a cryogenic freezer, comprising: the above-disclosed conveyor support system; an endless conveyor extending between and around a set of rollers and an endless conveyor drive operatively associated with and adapted and configured to drive the endless conveyor, an upper portion of the endless conveyor being supported by the upper conveyor support rails, a lower portion of the endless conveyor being supported by the lower conveyor support rails; a lower housing having first and second side walls, upper surfaces of the lower housing side walls supporting the first and second legs of the conveyor rail supports, respectively; an upper housing having first and second side walls; and a liquid cryogen delivery system comprising liquefied gas piping connected to a liquefied gas injection manifold disposed above the endless conveyor in an interior of the upper housing, wherein the upper surfaces of the lower housing side walls are adapted and configured to conform to lower surfaces of the upper housing side walls so as to provide a thermal seal between the upper and lower housings.

There is also disclosed a method of cooling food, comprising the following steps. The above-disclosed cryogenic freezer is provided. The drive is operated to allow travel of the endless conveyor from a front end of the freezer to a back end thereof. Food is introduced onto the endless conveyor adjacent the front end of the freezer. A liquefied gas is sprayed onto the food from the liquefied gas injection manifold.

The above-disclosed conveyor rail supports, conveyor support system, cryogenic freezer, and method of cooling food may include one or more of the following aspects:

- each of the upper conveyor support rails has a plurality of notches formed in a lower surface thereof that are adapted and configured to engage aligned notches in the upper bars of the plurality of conveyor rail supports; and
- each of the lower conveyor support rails has a plurality of notches formed in a lower surface thereof that are adapted and configured to engage aligned notches in the lower bars of the plurality of conveyor rail supports.

each conveyor rail support further comprises a header extending horizontally between the first and second support members above the upper bar.

the conveyor rail support further comprises first and second trunnions extending from the first and second members, respectively, in a direction perpendicular to the upper and lower bars each of the first and second legs of each of the conveyor rail supports includes first and second feet angled with respect to another, the first and second feet of each leg being adapted and configured to support the conveyor rail support upon an upper surface of a side wall of a lower housing of a freezer each of the conveyor rail supports is made of stainless steel each of the conveyor rail supports further comprises first and second footings extending from a lower surface of the lower bar that are adapted and configured to rest upon a floor of a lower housing of a freezer the cryogenic freezer further comprises a lift operatively associated with the upper housing and being adapted and configured to raise the upper housing above the lower housing the cryogenic freezer further comprises a plurality of pairs of means for lifting that extend downwardly from a lower surface of the upper freezer housing that correspond in number to the trunnions of the plurality of conveyor rail supports the plurality of pairs of means for lifting are disposed above the trunnions such that, when the lift is operated to raise the upper freezer housing, the means for lifting freely rise during a first portion of travel upwards to allow access between the upper housing and the endless conveyor and then engage and lift the trunnions during a second portion of travel upwards to lift the conveyor supports and endless conveyor and allow access between the conveyor support system and a bottom of the lower freezer housing the liquefied gas is liquid nitrogen the liquefied gas is liquid carbon dioxide

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
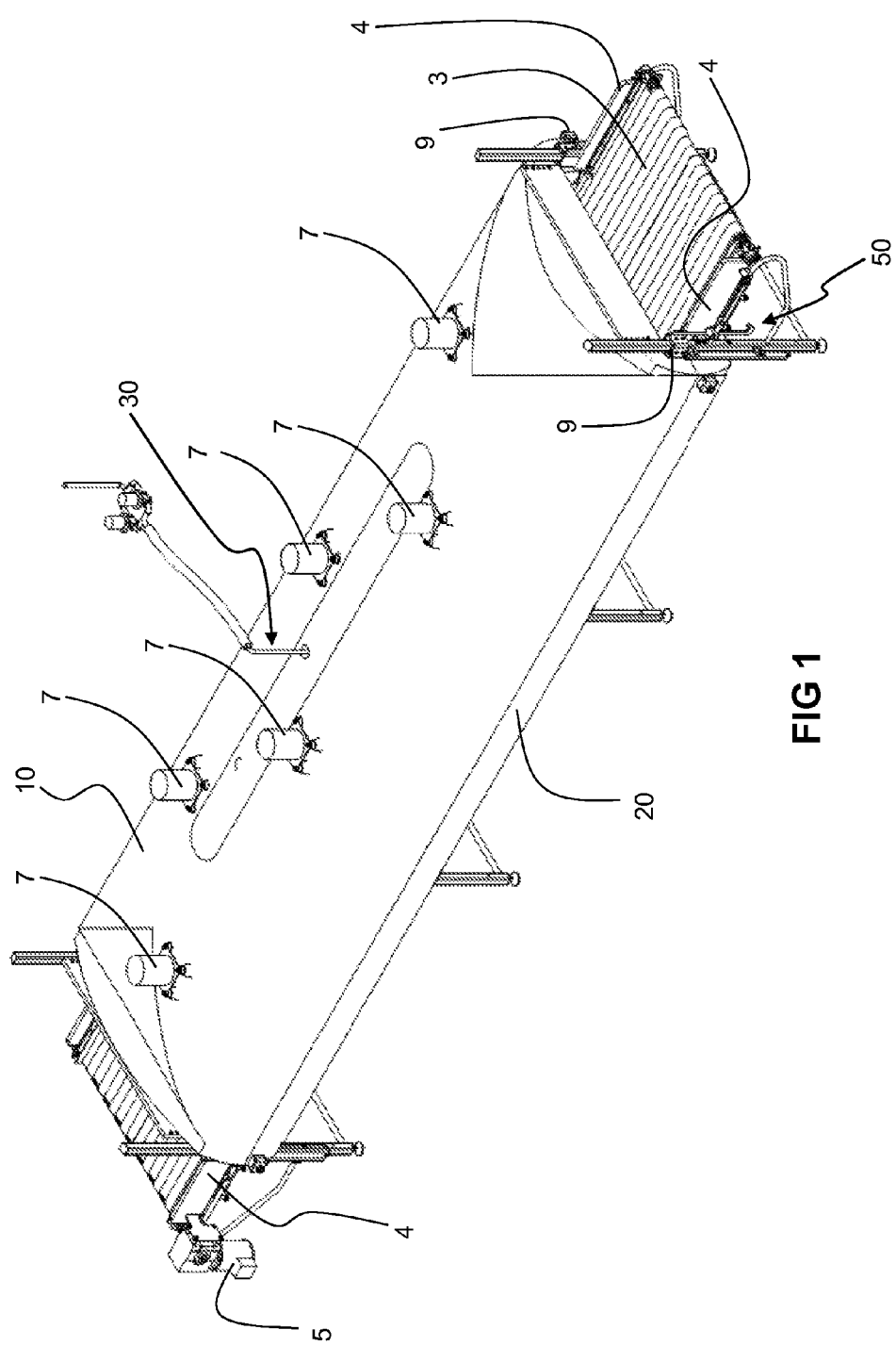
FIG. 1 is an isometric view of the disclosed freezer in a closed position.

As best illustrated in FIG. 1, the disclosed cryogenic freezer includes an enclosure including lower and upper housings 20, 10, a conveyor support system (not shown) supporting an endless belt 3 driven by a belt drive 5, a liquid cryogen delivery system 30, and a lift 9. Extending out of the upper housing 10 are multiple exhaust ports 7 for the exhausting of cryogenic gas from the freezer.

Figure 2:
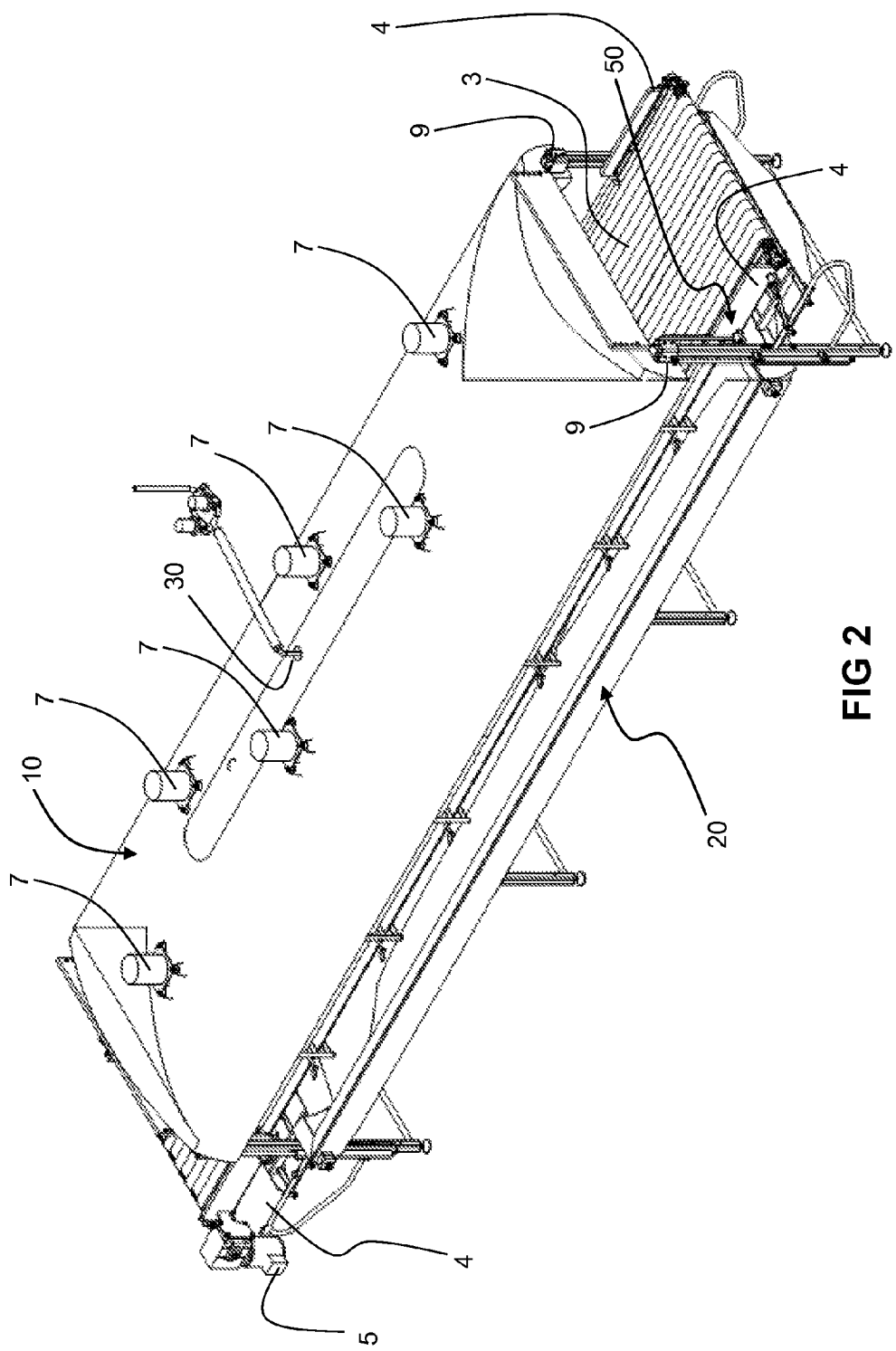
FIG. 2 is an isometric view of the disclosed freezer in an open position.

The lift 9 is fixed to a frame supporting the weight of the freezer and to the upper housing 10. As best shown in FIGS. 1-2, the lift 9 is adapted and configured to raise the upper housing 10 and conveyor support system to allow access to the endless belt 3, conveyor support system, and the interior of the lower housing 20. The lift 9 may be any known electromechanical or hydraulic device capable of raising the upper housing 10.

Figure 3:
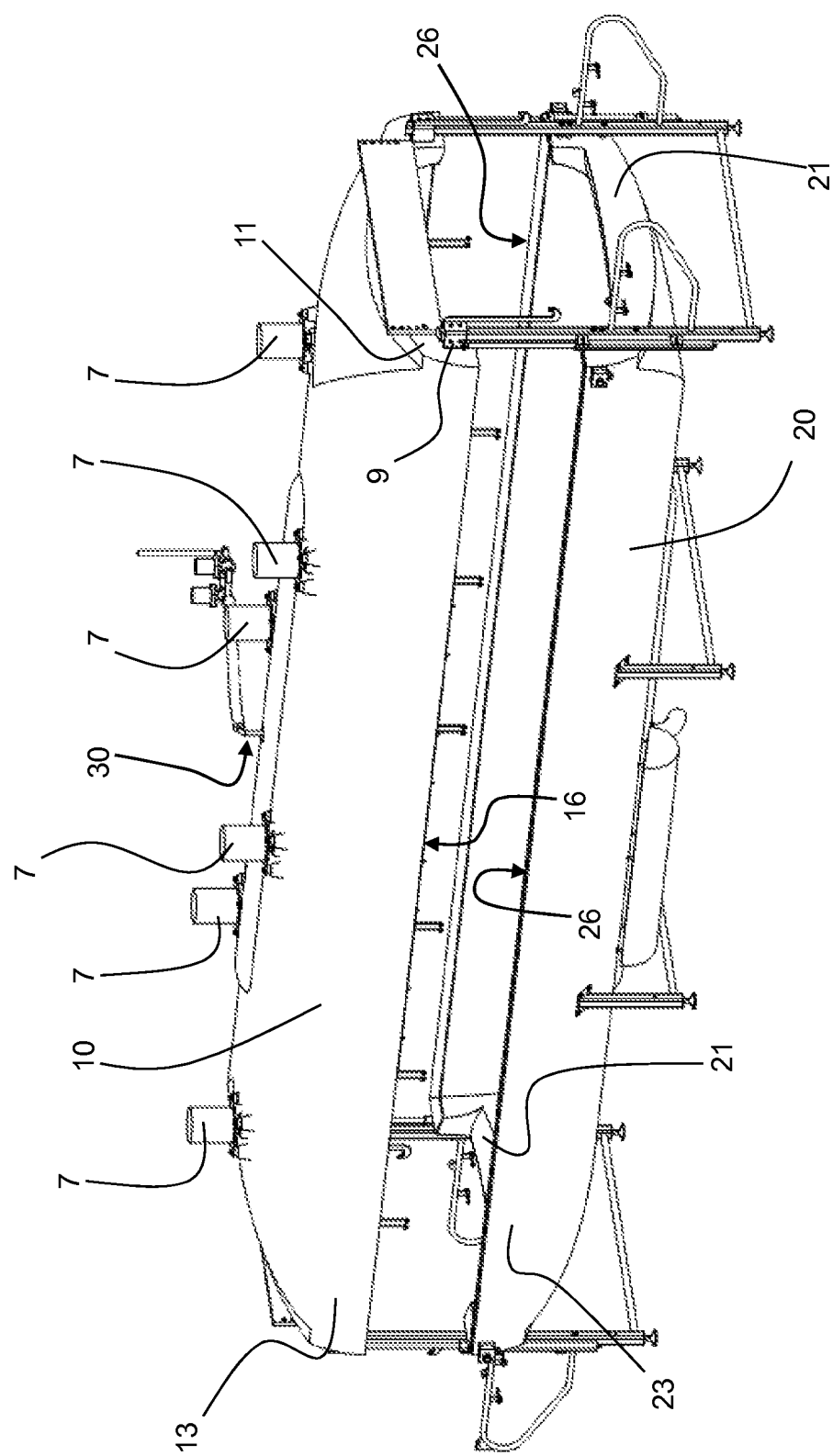
FIG. 3 is an isometric view of the disclosed freezer in an open position with the conveyor support, endless belt drive, and endless belt removed.

As best illustrated in FIG. 3, the lower housing 20 includes a pair of end walls 21 and a pair of side walls 23, while the upper housing 10 includes a pair of end walls 11 and a pair of side walls 13. Upper surfaces 26 of the side walls 23 are adapted and configured to conform to lower surfaces 16 of the side walls 13, which together with a gasket, form a thermal seal.

Figure 4:
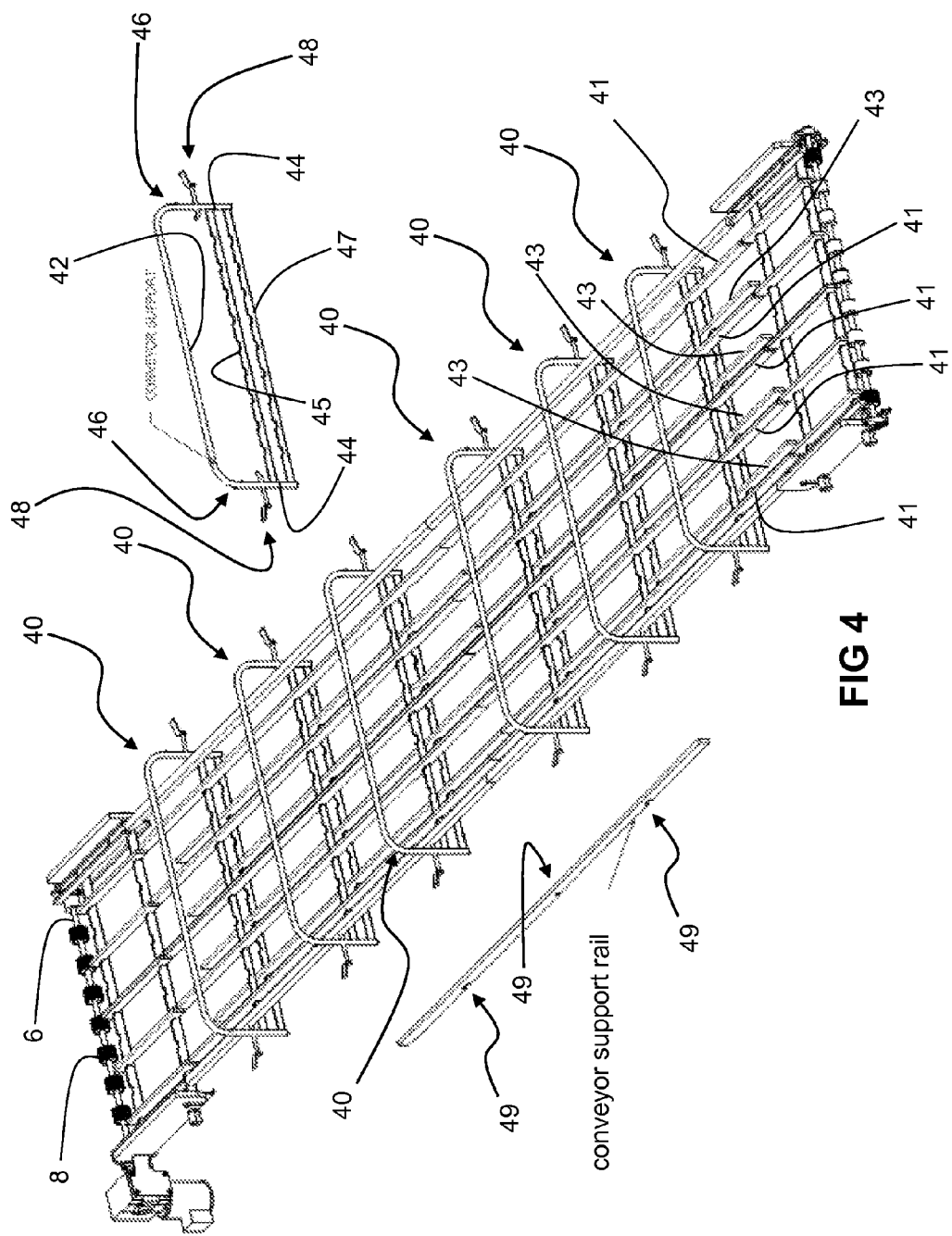
FIG. 4 is an isometric view of the disclosed conveyor support, extra conveyor support rail, and extra conveyor support.
Figure 5:
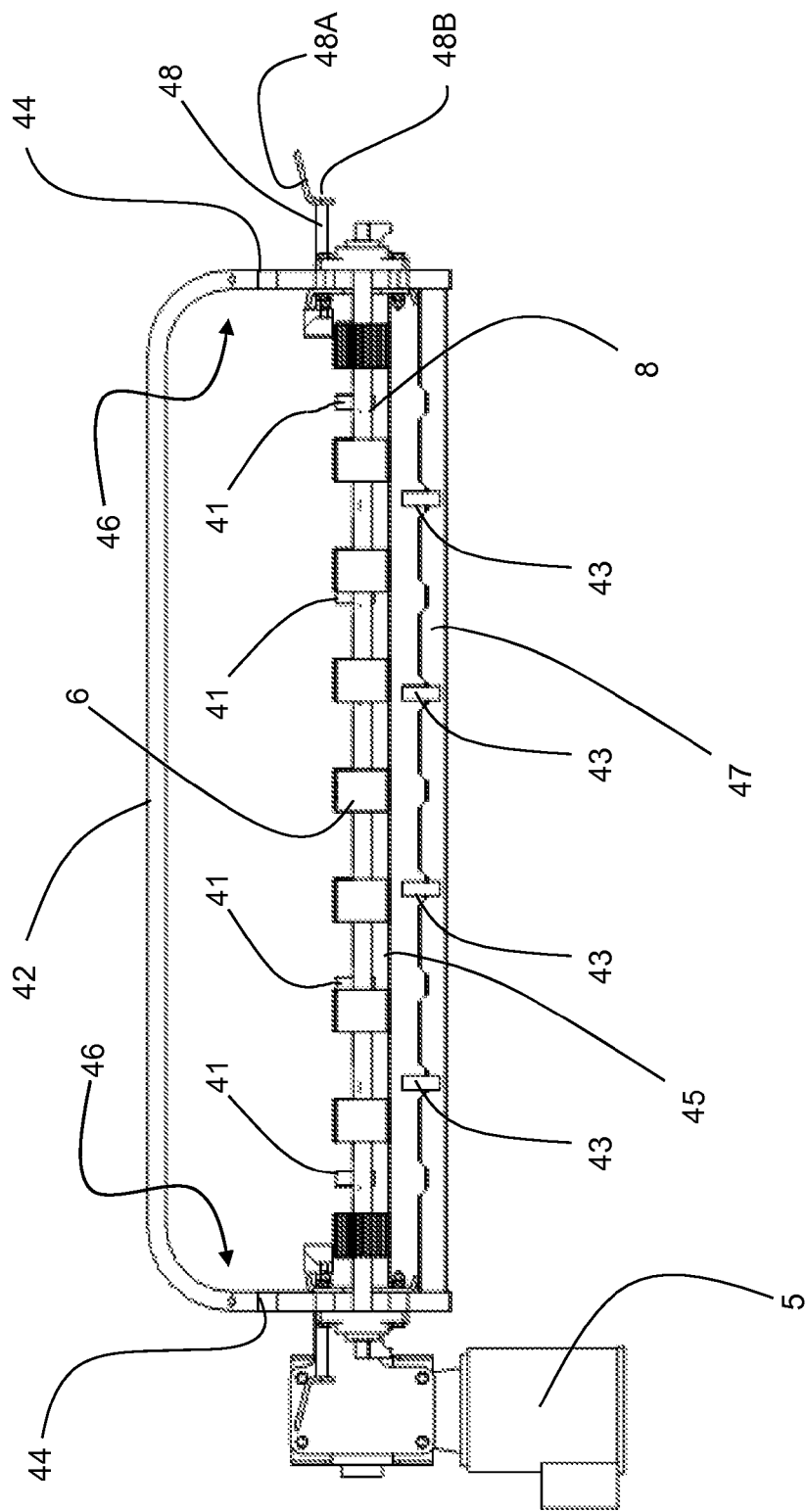
FIG. 5 is an end view of the disclosed conveyor support and endless belt drive.
Figure 6:
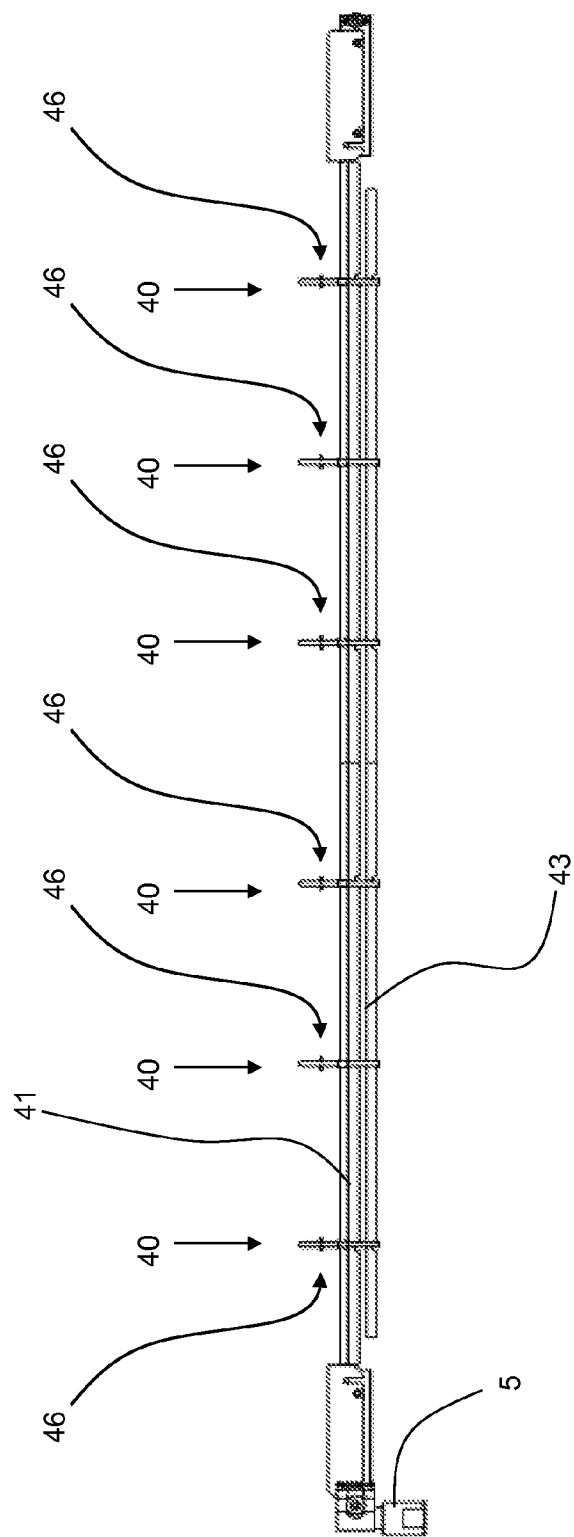
FIG. 6 is a side view of the disclosed conveyor support and endless belt drive.

As best shown in FIGS. 4-6, the conveyor support includes a plurality of conveyor rail supports 40 spacingly arranged in parallel fashion. Each of the conveyor rail supports 40 includes a horizontally-extending support header 42 connected at each end thereof in curved fashion via an elbow to downwardly extending vertical support members 44. Extending outwardly from each of the vertical support members 44 parallel to the header 42 is a leg 48 having angled feet 48A, 48B. Each of the feet 48A rests upon an upper surface 26 of a side wall 23 to stabilize, and help support the weight of, the conveyor support system. The upper surface 26 is angled downwardly inward to correspond with the angle between the feet 48A, 48B so that there is clearance for the feet 48A, 48B between the upper and lower housings 10, 20 when the freezer is in the closed state. The angled surface 26 also sheds water for an improved hygiene design. Preferably, the header 42 and support members 44 are integrally formed and form a U-shape. A trunnion or pair of projections 46 are disposed on each of the support members 44 and extend in a direction perpendicular to that of the header 42.

An upper bar or comb 45 extends horizontally between each pair of vertical support members 44 of each conveyor rail support 40 and includes a plurality of notches formed in an upper surface thereof. A lower bar or comb 47 extends horizontally between each pair of vertical support members 44 (parallel to and underneath the upper bar 45 the upper bar) of each conveyor rail support 40 and includes a plurality of notches formed into an upper side thereof. The notches 49 formed in the upper bars 45 are adapted and configured to engage and loosely hold (without fasteners) a plurality of horizontally extending upper rails 41. The plurality of upper rails 41 form a planar support surface across which an upper portion of the endless belt 3 travels in a direction parallel to the upper rails 41. Similarly, the notches 49 formed in the lower bars 47 are adapted and configured to engage and loosely hold (without fasteners) a plurality of horizontally extending lower rails 43. The plurality of lower rails 43 form a planar support surface across which a lower portion of the endless belt 3 travels in a direction parallel to the upper rails 41 and opposite to the direction of travel of the upper portion of the endless belt 3. Footings (not shown) extending from a lower surface of the lower bar are adapted and configured to rest upon a floor of a lower housing 20. Preferably, the notches in each of the upper and lower bars 45, 47 correspond in number to the number of upper and lower conveyor support rails 41, 43, respectively.

Preferably, each of the conveyor rail supports 40 are made of a metal such as food grade stainless steel while each of the rails 41, 43 are made of a food grade plastic such as ultra high molecular weight polyethylene (UHMW PE).

The conveyor support system made up of conveyor rail supports 40 and rails 41, 43 are held in place in the freezer without the use of any fasteners. Because the conveyor support system is not fastened to the upper or lower housings 20, 10, the component parts of the conveyor support system are freely allowed to expand or contract as the temperature is increased or decreased. Because the conveyor support freely floats upon the upper surfaces 26 (or upon a gasket covering the upper surfaces 26), differences in coefficients of thermal expansion between the conveyor rail supports 40 and the rails 41, 43 do not result in thermal stresses causing unnecessary wear and tear or even damage to the freezer over time.

For equipment used in food processing, such as food freezing tunnels, easy access to the bottom of the conveyor is important. Inspectors must be able to see and swab any area to search for bacteria and operators must be able to clean any area after use. By employing a multi-stage top lift system, the interior of the freezer above and below the endless conveyor 3 and conveyor support system can be easily accessed. As best illustrated in FIG. 3, a multi-stage lifting mechanism is described. The lift 9 raises the upper housing 10 upwardly from the lower housing 20 in a first stage of travel. This allows access in between the upper housing 10 and the endless conveyor 3. Extending downwardly from the upper housing 10 is a plurality of means for lifting 19. During a second stage of travel after completion of the first stage, the means for lifting 19 engage with and raise up the trunnions 46 to lift up the conveyor support system from the lower housing 20 to allow access therebetween. The means for lifting 19 can be any mechanical device which lifts up the conveyor support system. This can include hooks which engage the trunnions 46 or flexible cables, chains, or slide-and-catch mechanisms (such as T-shaped rods which slide through and catch in eye hooks). During the second stage of travel, a hook 50 associated with each lift 9 also engages with and lifts support brackets 4 to also raise the ends of the conveyor support system.

In operation of the cryogenic freezer, the drive is actuated to allow travel of the endless conveyor from a front end of the freezer to a back end thereof. Food is introduced onto the endless conveyor adjacent the front end of the freezer. A liquefied gas conveyed by liquefied gas piping and liquefied gas injection manifold is sprayed onto the food inside the freezer. The thus-cooled food is further conveyed along the endless belt to the back end of the freezer and removed for packaging or further processing. The liquefied gas may be liquid nitrogen in which case liquid nitrogen droplets impinge the food surfaces or liquid carbon dioxide in which dry ice snow impinges the food surfaces.

The conveyor rail supports, conveyor support system, and freezer offer an additional advantage of ease of assembly and disassembly for purposes of cleaning and ease of modifying the positioning of the conveyor rail supports 40. Because the upper and lower conveyor support rails 41, 43 are held by the upper and lower bars 45, 47 by friction and gravity without the use of fasteners, the rails 41, 43 may be easily removed from the conveyor rail supports 40. Because the conveyor rail supports 40 rest upon upper surfaces 26 of the lower housing 20 via the legs 48 and are not fastened thereto, the conveyor rail supports 40 may be easily moved within, or removed from, the freezer.

Preferred processes and apparatus for practicing the present invention have been described. It will be understood and readily apparent to the skilled artisan that many changes and modifications may be made to the above-described embodiments without departing from the spirit and the scope of the present invention. The foregoing is illustrative only and that other embodiments of the integrated processes and apparatus may be employed without departing from the true scope of the invention defined in the following claims.

What is claimed is:

1. A cryogenic freezer, comprising a conveyor support system, an endless conveyor, a lower housing, an upper housing, and liquid cryogen delivery system, wherein:
   the conveyor support system comprises a plurality of conveyor rail supports, a plurality of upper conveyor support rails, and a plurality of lower conveyor support rails;
   each of the conveyor rail supports extending in a transverse direction and comprises:
      parallel spaced vertically extending first and second support members,
      an upper bar connected to and extending between the first and second support members, the upper bar having a plurality of notches formed into an upper side thereof,
      a lower bar parallel to the upper bar being connected to and extending between the first and second support members underneath the upper bar, the lower bar having a plurality of notches formed into an upper side thereof,
      a first leg extending outwardly away from the first support member, and
      a second leg extending outwardly away from the second support member;
   each of the plurality of upper conveyor support rails is engaged, nestled and held by friction and gravity without any fasteners by the notches formed in the upper bars and extends in a longitudinal direction perpendicular to the plurality of conveyor rail supports;
   each of the plurality of lower conveyor support rails is engaged, nestled and held by friction and gravity without any fasteners by the notches formed in the lower bars and extends in a longitudinal direction perpendicular to the plurality of conveyor rail supports;
   each of the plurality of conveyor rail supports is spacingly arranged with respect to one another so as to engage and hold the plurality of upper conveyor support rails in the notches of the upper bars and to engage and hold the plurality of lower conveyor support fails in the notches of the lower bars;
   the endless conveyor extends between and around a set of rollers and an endless conveyor drive operatively associated with and adapted and configured to drive the endless conveyor, an upper portion of the endless conveyor being supported by the upper conveyor support rails, a lower portion of the endless conveyor being supported by the lower conveyor support rails;
   the lower housing has first and second side walls, upper surfaces of the lower housing side walls supporting the first and second legs of the conveyor rail supports, respectively;
   the upper housing has first and second side walls;
   the liquid cryogen delivery system comprises liquefied gas piping connected to a liquefied gas injection manifold disposed above the endless conveyor in an interior of the upper housing; and the upper surfaces of the lower housing side walls are adapted and configured to conform to lower surfaces of the upper housing side walls so as to provide a thermal seal between the upper and lower housings.

2. The cryogenic freezer of claim 1, wherein:

each of the upper conveyor support rails has a plurality of notches formed in a lower surface thereof that are adapted and configured to engage aligned notches in the upper bars of the plurality of conveyor rail supports; and each of the lower conveyor support rails has a plurality of notches formed in a lower surface thereof that are adapted and configured to engage aligned notches in the lower bars of the plurality of conveyor rail supports.

3. The cryogenic freezer of claim 1, wherein each conveyor rail support further comprises a header extending horizontally between the first and second support members above the upper bar.

4. The cryogenic freezer of claim 1, wherein the conveyor rail support further comprises first and second trunnions extending from the first and second support members, respectively, in a direction perpendicular to the upper and lower bars.

5. The cryogenic freezer of claim 1, wherein each of the conveyor rail supports further comprises first and second footings extending from a lower surface of the lower bar that are adapted and configured to rest upon a floor of the lower housing.

6. The cryogenic freezer of claim 1, further comprising a lift operatively associated with the upper housing and being adapted and configured to raise the upper housing above the lower housing.

7. The cryogenic freezer of claim 1, wherein:

the cryogenic freezer further comprises a plurality of pairs of means for lifting that extend downwardly from a lower surface of the upper freezer housing that correspond in number to the trunions of the plurality of conveyor rail supports; and the plurality of pairs of means for lifting are disposed above the trunions such that, when the lift is operated to raise the upper freezer housing, the means for lifting freely rise during a first portion of travel upwards to allow access between the upper housing and the endless conveyor and then engage and lift the trunions during a second portion of travel upwards to lift the conveyor supports and endless conveyor and allow access between the conveyor support system and a bottom of the lower freezer housing.

8. A method of cooling food using the cryogenic freezer of claim 1, wherein:

the drive is operated to allow travel of the endless conveyor from a front end of the freezer to a back end thereof;

food is introduced onto the endless conveyor adjacent the front end of the freezer; and a liquefied gas is sprayed onto the food from the liquefied gas injection manifold.

* * * * *